US012673537B2

(12) United States Patent　　　　　(10) Patent No.:　US 12,673,537 B2
Okabe et al.　　　　　　　　　　　　　(45) Date of Patent:　　Jul. 7, 2026

(54) WIND DIRECTION ADJUSTING DEVICE FOR VEHICLE REGISTER

(71) Applicants:SHIGERU CO., LTD., Ota (JP); SUBARU CORPORATION, Tokyo (JP)

(72) Inventors: Masakazu Okabe, Ota (JP); Mamoru Sugawara, Tokyo (JP)

(73) Assignees: Shigeru Co., Ltd., Ota (JP); Subaru Corporation, Tokyo (JP)

( * ) Notice:　Subject to any disclaimer, the term of this patent is extended or adjusted under 35 U.S.C. 154(b) by 374 days.

(21) Appl. No.: 18/432,501

(22) Filed:　Feb. 5, 2024

(65)　　　　Prior Publication Data

US 2024/0308300 A1　　Sep. 19, 2024

(30)　　Foreign Application Priority Data

Mar. 16, 2023　(JP) ................................. 2023-041864

(51) Int. Cl.
B60H 1/34　　　　(2006.01)
(52) U.S. Cl.
CPC ............. B60H 1/3421 (2013.01); B60H 1/34 (2013.01)
(58) Field of Classification Search
CPC ................................. B60H 1/3421; B60H 1/34
See application file for complete search history.

(56)　　　　　References Cited

FOREIGN PATENT DOCUMENTS

CN　　　210733770 U　*　6/2020
JP　　　H10138750 A　*　5/1998
JP　　　H10-250357 A　　9/1998
JP　　　2016210337 A　*　12/2016
KR　　　101577634 B1　*　12/2015

* cited by examiner

*Primary Examiner* — William C Doerrler
(74) *Attorney, Agent, or Firm* — Jodi A. Reynolds; Harter Secrest & Emery, LLP

(57)　　　　　ABSTRACT

A wind direction adjusting device includes a center fin on a downstream side extending in a direction crossing an upstream side fin, an operation knob and an elastic member. The operation knob is slidably attached to the center fin and interlocked with the upstream side fin. A direction of the upstream side fin can be adjusted by sliding the operation knob. The elastic member is disposed between the operation knob and the center fin, generating sliding resistance when the operation knob is slid. A protrusion protruded toward the center fin is disposed in the operation knob. A receiving recess movably receiving the protrusion is formed in the center fin along a sliding direction of the operation knob. Stopper portions blocking movement of the protrusion are formed in opposite ends of the receiving recess. The elastic member is disposed between the protrusion and the stopper portions.

2 Claims, 12 Drawing Sheets

FIG. 2

WIND DIRECTION ADJUSTING DEVICE FOR VEHICLE REGISTER

CROSS-REFERENCE TO RELATED APPLICATIONS

The present application claims priority from Japanese Patent Application No. 2023-041864 filed on Mar. 16, 2023, the entire contents of which are hereby incorporated by reference.

BACKGROUND

The present disclosure relates to a wind direction adjusting device for adjusting wind direction of a vehicle register with an operation knob.

Generally, a vehicle register includes a wind direction adjusting device. Japanese Unexamined Patent Application Publication No. H10-250357 discloses a wind direction adjusting device 90a disposed in a vehicle register 90 as shown in FIGS. 7A and 7B. The wind direction adjusting device 90a includes a front louver 92 extending in a direction crossing an extending direction of a rear louver 91, an operation knob 93 slidably attached to the front louver 92 and linked to the rear louver 91 and an elastic member 94 disposed between the front louver 92 and the operation knob 93. Backlash of the operation knob 93 that may be generated as the operation knob 93 is slid is absorbed by the elastic member 94. The operation knob 93 may be slidably operated to adjust a direction of the rear louver 91.

As show in FIG. 7B, an engagement claw 95 is disposed in the operation knob 93. A guide recess 96 to be engaged with the engagement claw 95 is formed in the front louver 92. Stopper portions 97 are respectively formed in opposite end portions of the guide recess 96. The engagement claw 95 may be abutted against the stopper portion 97, thereby the operation knob 93 being stopped from sliding.

SUMMARY

The present disclosure provides a wind direction adjusting device for a vehicle register. The wind direction adjusting device includes a downstream side fin extending in a direction crossing an extending direction of an upstream side fin, an operation knob slidably attached to the downstream side fin, the operation knob interlocked with the upstream side fin, a direction of the upstream side fin being adjusted by sliding of the operation knob and an elastic member disposed between the operation knob and the downstream side fin, the elastic member generating sliding resistance when the operation knob is slid. A protrusion is disposed in one of the operation knob and the downstream side fin, the protrusion protruded toward the other of the operation knob and the downstream side fin. A receiving recess is formed in the other of the operation knob and the downstream side fin along a sliding direction of the operation knob, the receiving recess relatively movably receiving the protrusion. Stopper portions blocking relative movement of the protrusion and the receiving recess with respect to each other are formed in opposite ends of the receiving recess. The elastic member is disposed between the protrusion and the stopper portions.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 2 is a cross-sectional view taken along line II-II of FIG. 1.

DETAILED DESCRIPTION

In the wind direction adjusting device 90a disclosed in the Japanese Unexamined Patent Application Publication No. H10-250357, the engagement claw 95 is abutted against the stopper portion 97 when the operation knob 93 is stopped. Thereby, an impact may be generated, and thereby an abnormal noise may be generated. To solve the problems mentioned above, it is desired to provide a wind direction adjusting device for a vehicle register.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

A wind direction adjusting device for a vehicle register according to one embodiment of the present disclosure is described hereinafter with reference to the drawings. In the following description, front-rear and left-right directions are determined in accordance with front-rear and left-right directions of the vehicle.

Figure 1:
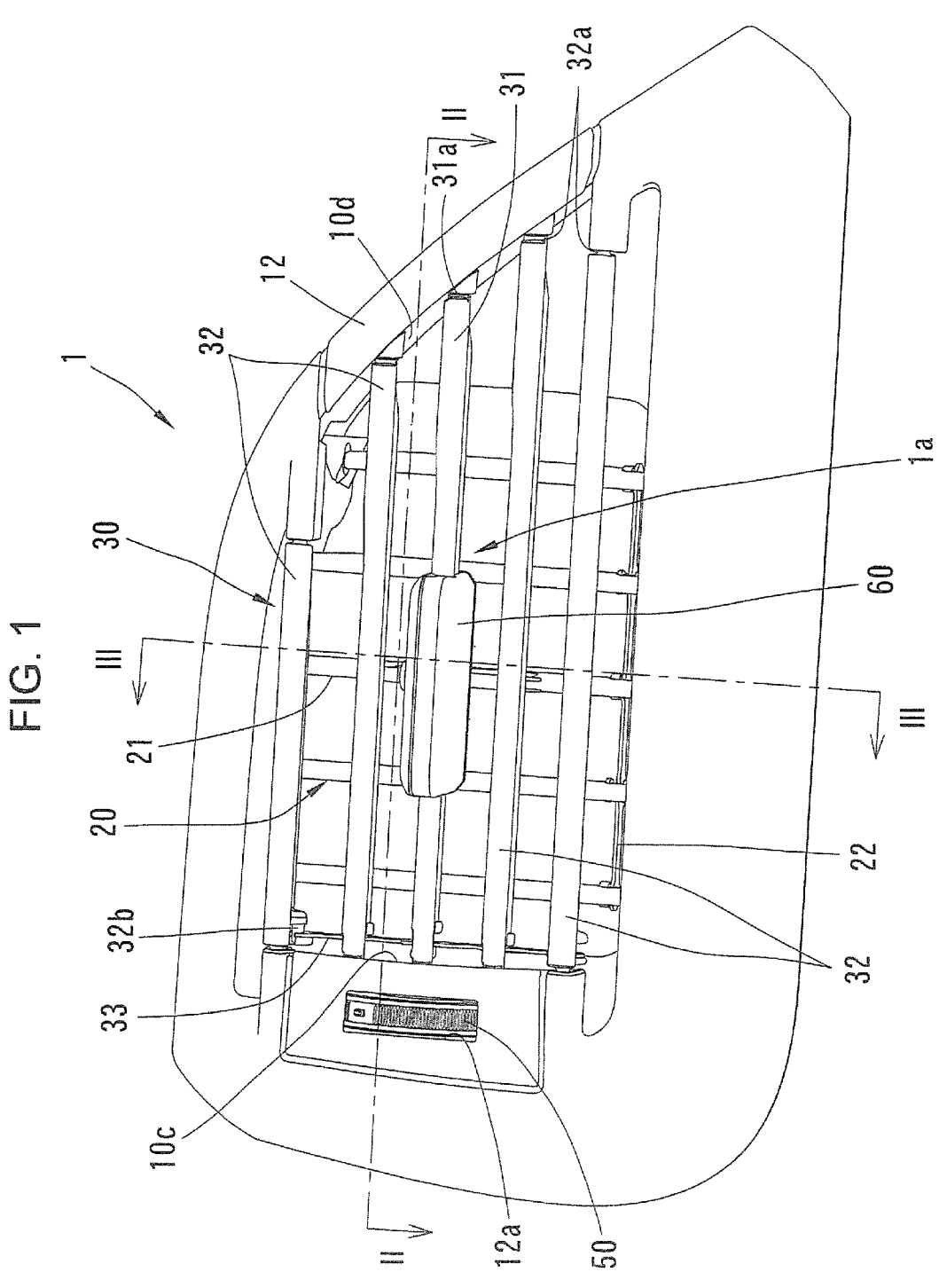
FIG. 1 is a front view of a vehicle register having a wind direction adjusting device according to an embodiment of the present disclosure.
Figure 2:
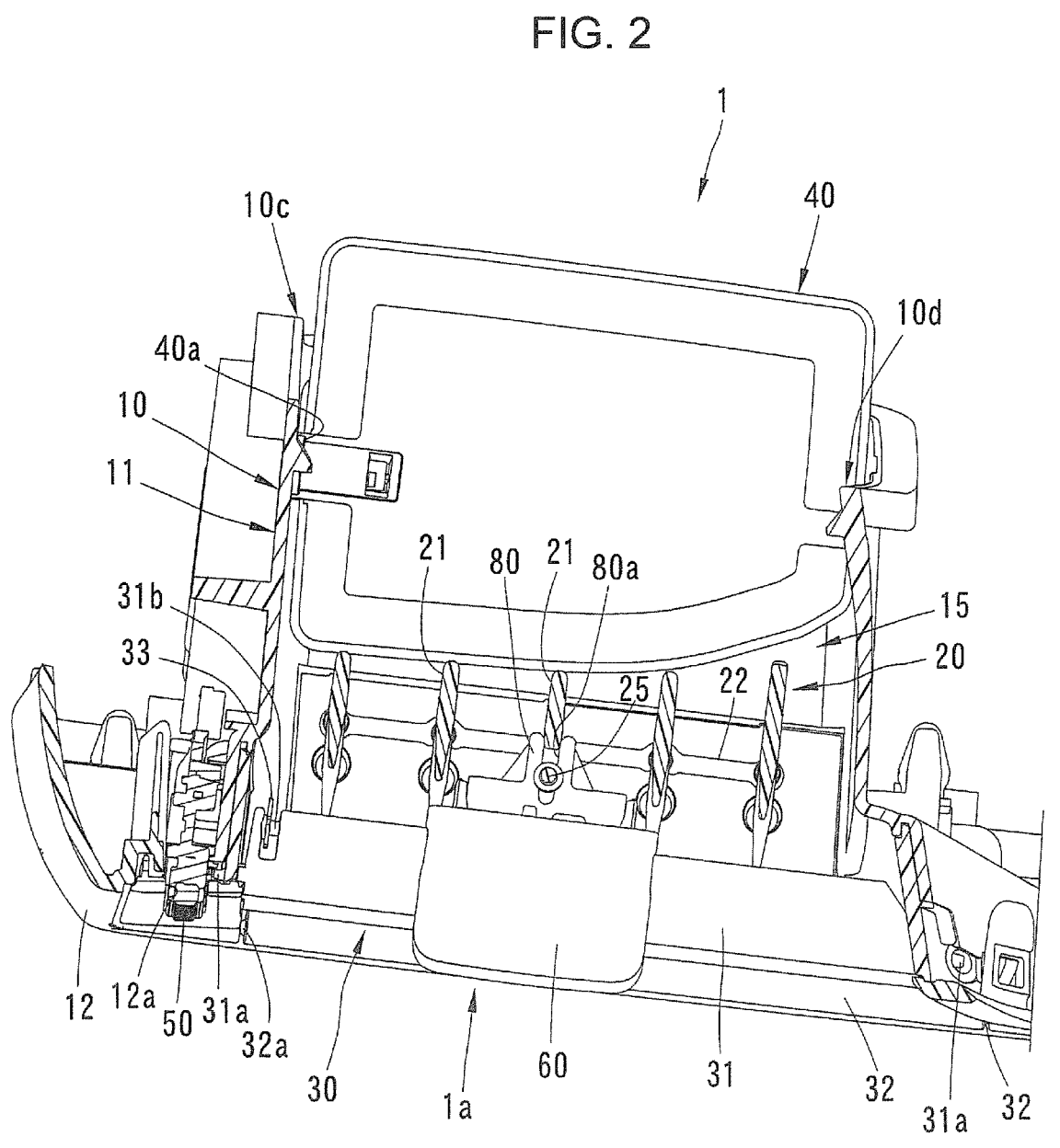
Figure 3:
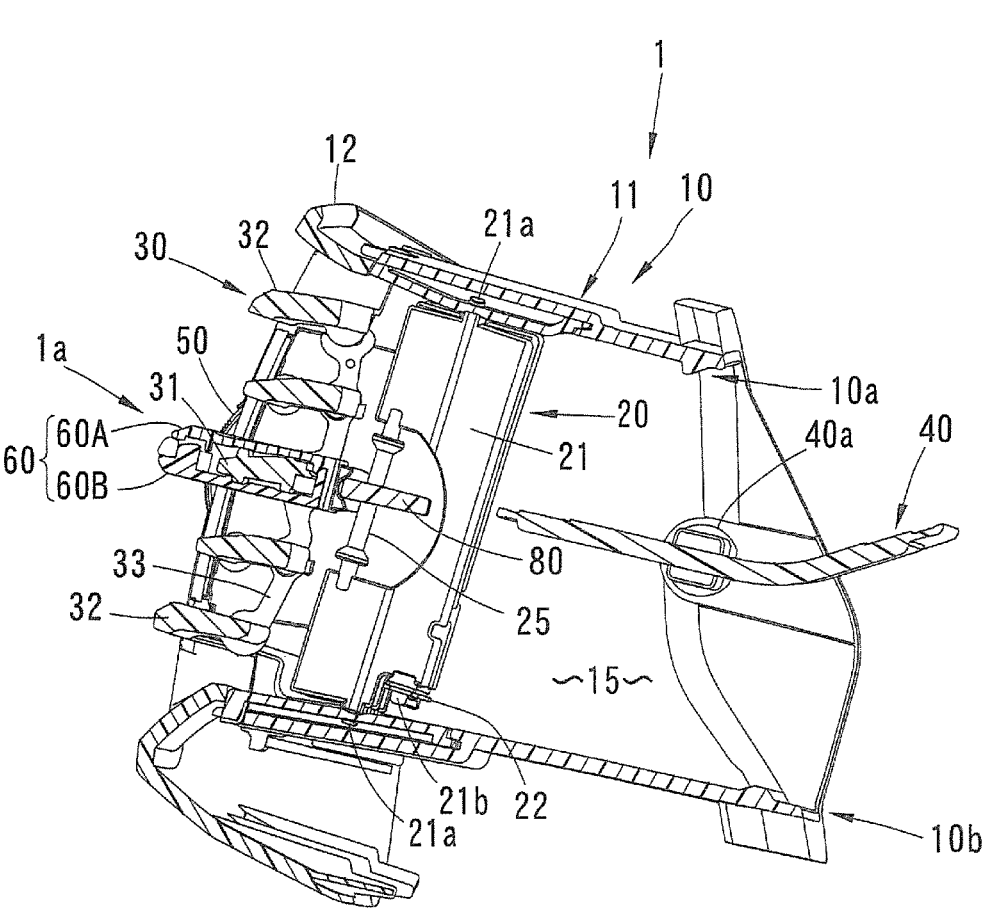
FIG. 3 is a cross-sectional view taken along line III-III of FIG. 1.

FIGS. 1 to 3 show an overall structure of a register 1. The register 1 is to be disposed in an instrument panel of the vehicle. The register 1 includes a register body 10 having an air passage 15 extending in a longitudinal direction of the vehicle, an upstream side fin group 20 disposed in the air passage 15 on an upstream side, a downstream side fin group 30 disposed in the air passage 15 on a downstream side, a shutter 40 disposed in the air passage 15 on a further upstream side with respect to the upstream side fin group 20 and an operation dial 50 for operating to open and close the shutter 40 as main components.

The register body 10 includes an upper wall portion 10a, a lower wall portion 10b, a left side wall portion 10c that extends generally vertically and a right side wall portion 10d that is inclined. An upstream end of the air passage 15 of the register body 10 is connected to a duct from an air conditioner. A downstream end of the air passage 15 serves as a blow outlet. Temperature-conditioned air from the air conditioner is blown out toward an interior of the vehicle through the blow outlet.

The register body 10 includes a case 11 having a cylindrical configuration and a frame 12 (also known as a bezel) covering a downstream end portion of the case 11 on a vehicle interior side.

A window 12a exposing a portion of the operation dial 50 is formed in a left side portion of the frame 12 on the vehicle interior side.

The upstream side fin group 20 includes a plurality of (five in this embodiment) fins 21. The fins 21, each having a configuration of an elongated plate extending in a vertical direction, are disposed spaced from each other in the left-right direction.

Each of the fins 21 is supported by the upper wall portion 10a and the lower wall portion 10b of the register body 10 on the case 11 side such that each of the fins 21 is rotatable about a rotation axis extending vertically via rotation shafts 21a formed at upper and lower ends thereof.

Each of the fins 21 has an interlocking shaft 21b in a lower end portion thereof on the upstream side with respect to the rotation shaft 21a. The interlocking shafts 21b are rotatably connected to an interlocking link 22 extending in the left-right direction, thereby the fins 21 are coordinated in motion.

One fin 21 of the upstream side fin group 20 (fin in the middle in this embodiment) has a cutout portion in a middle portion thereof in the vertical direction on the downstream side. An engagement shaft 25 is disposed at a downstream end of the cutout portion.

The downstream side fin group 30 includes a plurality of (five in this embodiment) fins. Of these fins, a center fin is denoted with reference numeral 31 and four side fins on the upper and lower sides are denoted with reference numeral 32. The fins 31, 32, each having a configuration of an elongated plate extending in the left-right direction, are disposed spaced from each other in the vertical direction.

Each of the fins 31, 32 is supported by the left side wall portion 10c and the right side wall portion 10d of the register body 10 on the frame 12 side such that each of the fins 31, 32 is rotatable about a rotation axis extending in the left-right direction via rotation shafts 31a, 32a formed at left and right ends thereof.

Each of the fins 31, 32 has an interlocking shaft 31b, 32b in a left end portion thereof on the upstream side with respect to the rotation shafts 31a, 32a. The interlocking shafts 31b, 32b are connected to each other via an interlocking link 33, thereby the fins 31, 32 are coordinated in motion.

The shutter 40 having a configuration of a plate includes a rotation shaft at left and right side edges thereof (only a rotation shaft 40a at the left side edge is shown). The shutter 40 is supported by the left side wall portion 10c and the right side wall portion 10d of the register body 10 on the case 11 side such that the shutter 40 is rotatable about a rotation axis extending in the left-right direction.

The rotation shaft 40a of the shutter 40 at the left side edge thereof is connected to the operation dial 50 via a link mechanism that is not shown. The air passage 15 is opened and closed by rotating the shatter 40 by turning the operation dial 50.

The register 1 has a wind direction adjusting device 1a.

As shown in FIGS. 4, 5A, 5B and 5C, the wind direction adjusting device 1a includes one fin of the downstream side fin group 30 (center fin 31 in this embodiment), an operation knob 60 slidably attached to the center fin 31 and an elastic member 70 disposed between the center fin 31 and the operation knob 60 as main components.

Figure 4:
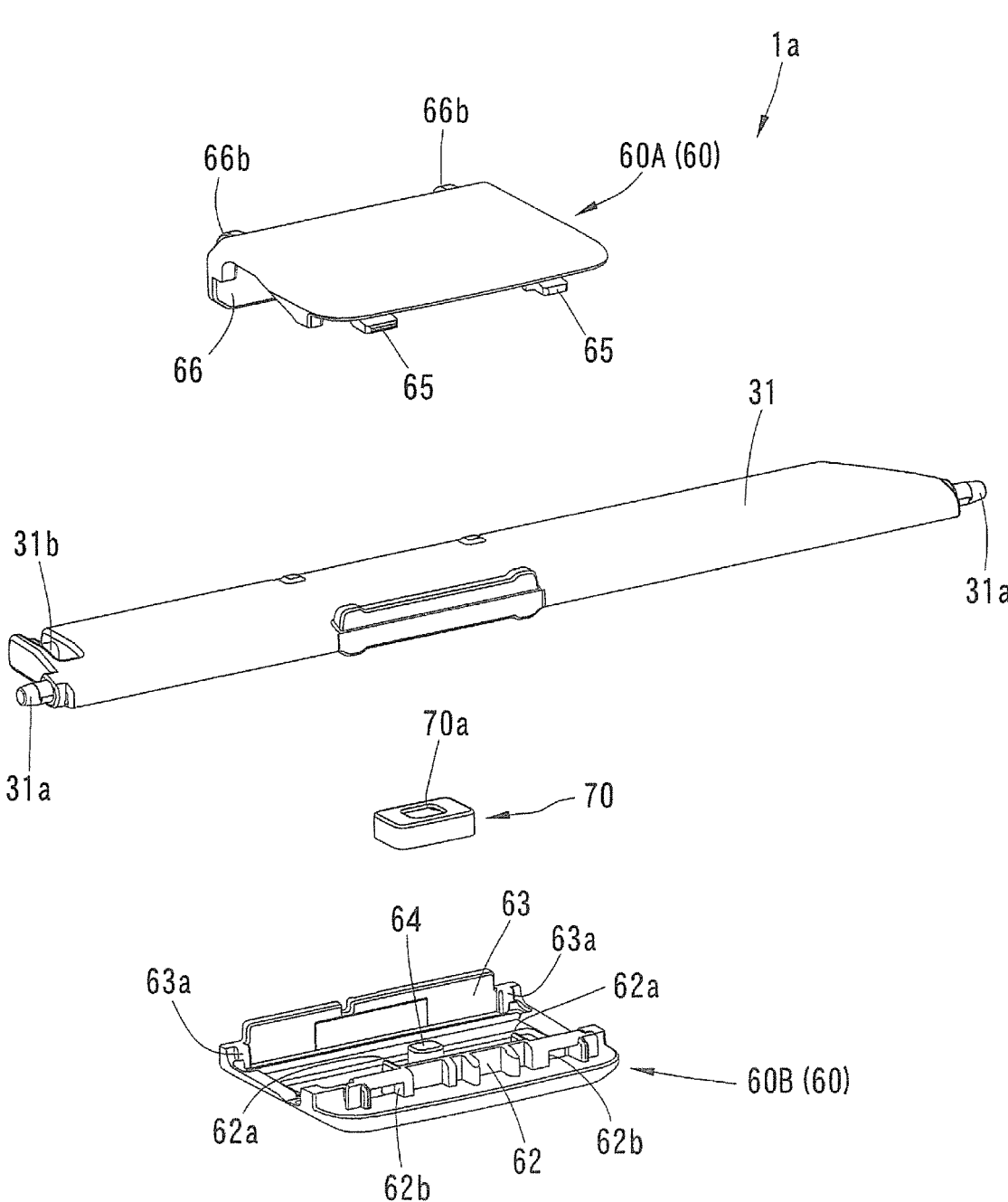
FIG. 4 is an exploded perspective view of the wind direction adjusting device.

The operation knob 60 is operated by an occupant from the vehicle interior side. As shown in FIGS. 2 and 3, the operation knob 60 is linked to the upstream side fins 21 via a fork portion 80 to be described later. As shown in FIGS. 3 and 4, the operation knob 60 includes an upper clamping piece 60A and a lower clamping piece 60B that hold the center fin 31 from above and below.

Figure 6A:
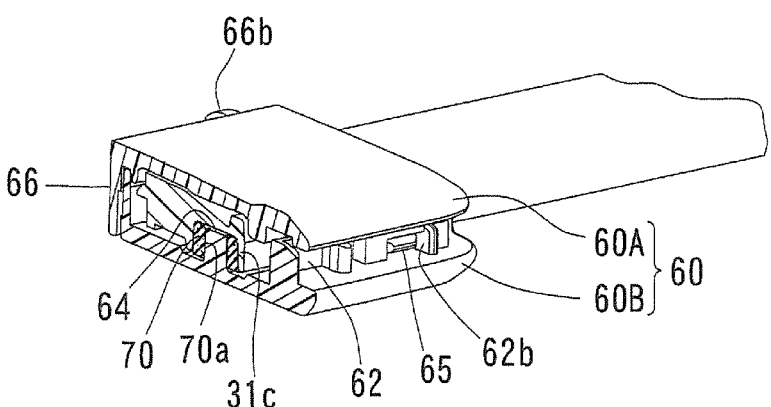
FIG. 6A is an enlarged cross-sectional perspective view of a main portion of the wind direction adjusting device taken along line 6A-6A of FIG. 5B.
Figure 6B:
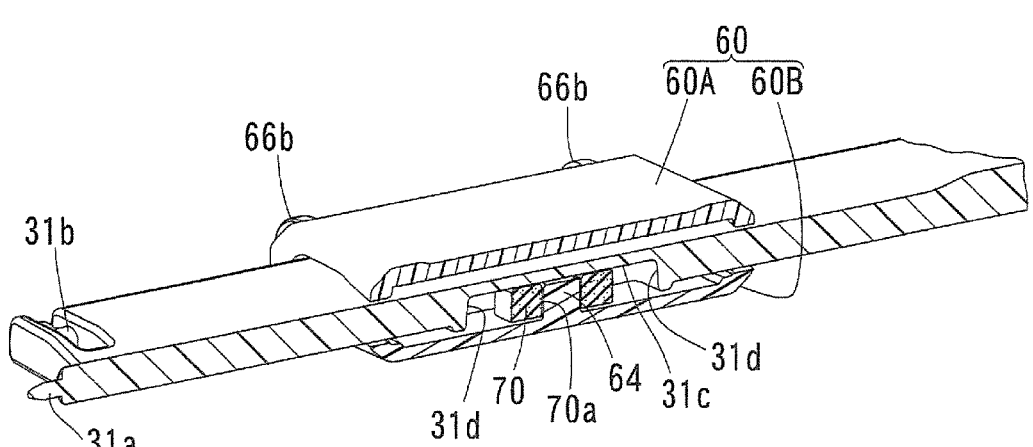
FIG. 6B is an enlarged cross-sectional perspective view of a main portion of the wind direction adjusting device taken along line 6B-6B of FIG. 5B.
Figure 6C:
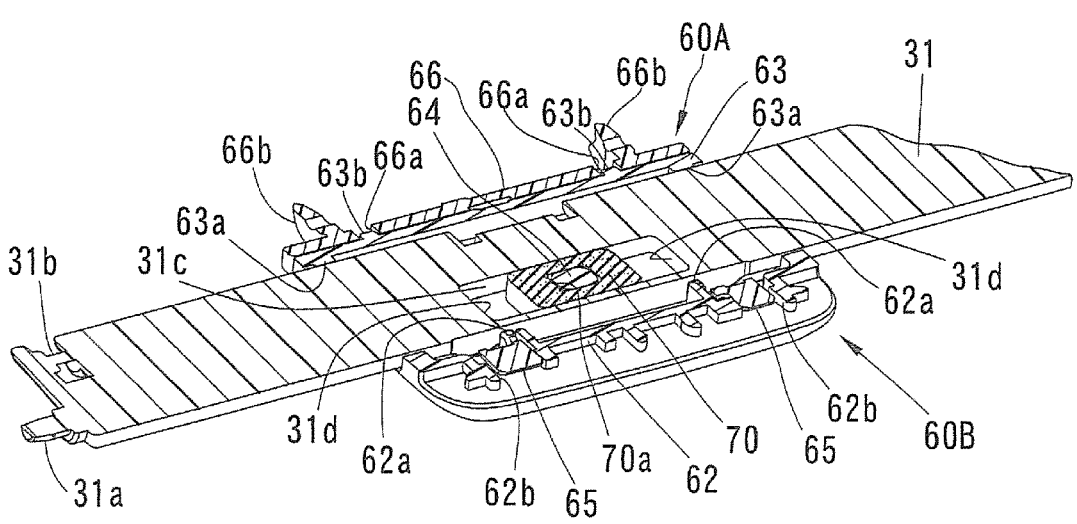
FIG. 6C is an enlarged cross-sectional perspective view of a main portion of the wind direction adjusting device taken along line 6C-6C of FIG. 5C.
Figure 7A:
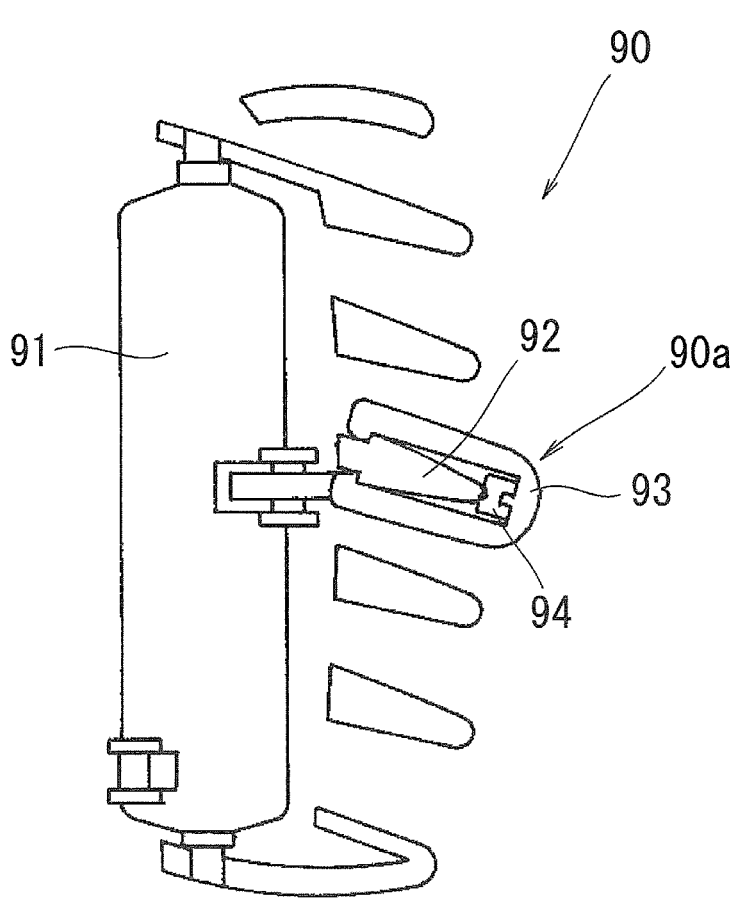
FIG. 7A is a cross-sectional view of a conventional wind direction adjusting device.
Figure 7B:
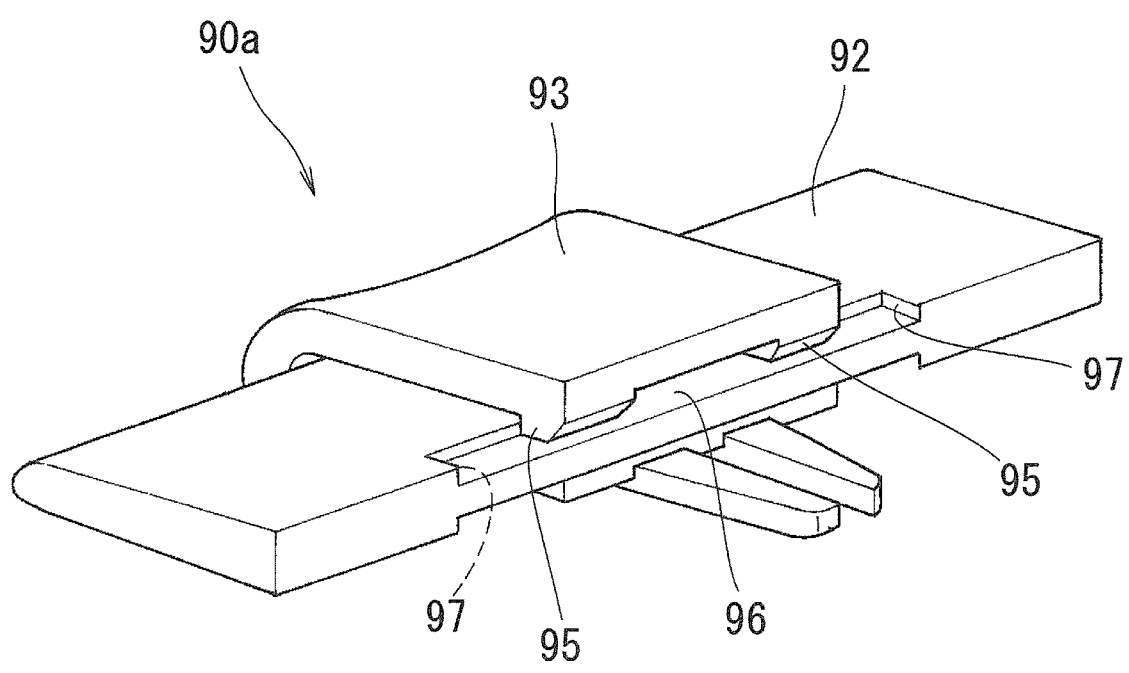
FIG. 7B is a perspective view of a conventional wind direction adjusting device.

As shown in FIGS. 4 and 6C, the lower clamping piece 60B includes a downstream side wall portion 62 on the downstream side and an upstream side wall portion 63 on the upstream side on an upper surface (surface on the upper clamping piece 60A side) thereof. The downstream side wall portion 62 is protruded upward and extends in the left-right direction. The upstream side wall portion 63 is protruded upward and extends in the left-right direction. The center fin 31 is disposed between the downstream side wall portion 62 and the upstream side wall portion 63.

The downstream side wall portion 62 has a plurality of (two in this embodiment) support portions 62a supporting the center fin 31 from the downstream side disposed therein. The upstream side wall portion 63 has a plurality of (two in this embodiment) support portions 63a supporting the center fin 31 from the upstream side disposed therein. The support portions 62a, 63a are abutted against the center fin 31 such that the support portions 62a, 63a and the center fin 31 are slidable with respect to each other in a longitudinal direction of the center fin 31 (left-right direction). Therefore, the lower clamping piece 60B of the operation knob 60 is slidable in the longitudinal direction of the center fin 31.

In the downstream side wall portion 62, catch holes 62b, 62b are respectively formed to the left of the support portion 62a on the left and to the right of the support portion 62a on the right.

As shown in FIG. 6C, in the upstream side wall portion 63, catch protrusions 63b (two in this embodiment) protruded toward upstream side are disposed between the two support portions 63a.

As shown in FIGS. 4, 6A and 6C, the upper clamping piece 60A includes a pair of catch claw portions 65, 65 on the downstream side and an upstream side wall portion 66 on the upstream side on an under surface (surface on the lower clamping piece 60B side) thereof. The pair of catch claw portions 65, 65 are disposed spaced from each other in the left-right direction. The upstream side wall portion 66 is protruded downward and extends in the left-right direction. The upstream side wall portion 66 has a pair of catch holes 66a, 66a (FIG. 6C) formed therein spaced from each other in the left-right direction.

The catch claw portions 65, 65 of the upper clamping piece 60A are engaged with the catch holes 62b, 62b of the lower clamping piece 60B and the catch protrusions 63b, 63b of the lower clamping piece 60B are engaged with the catch holes 66a, 66a of the upper clamping piece 60A. Thereby, the operation knob 60 is formed.

Figure 5A:
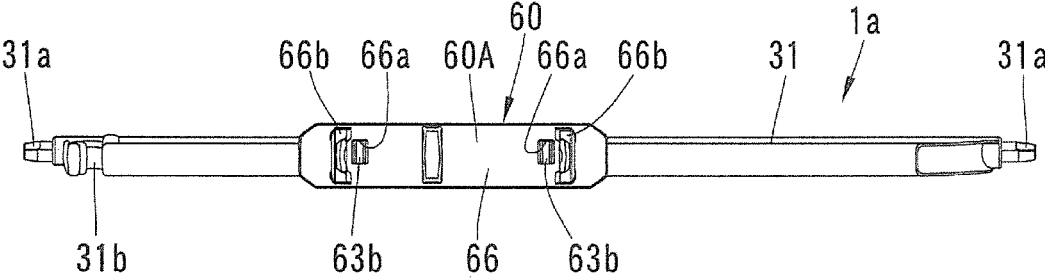
FIG. 5A is a rear view of the wind direction adjusting device, as viewed in the direction of arrow A of FIG. 5B.
Figure 5B:
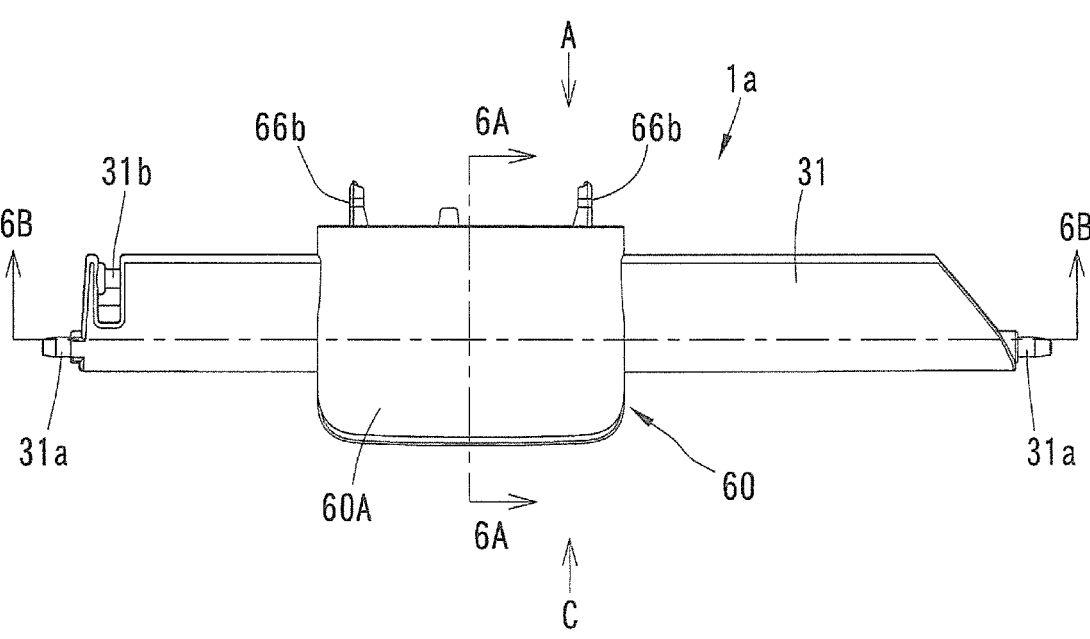
FIG. 5B is a plan view of the wind direction adjusting device.
Figure 5C:
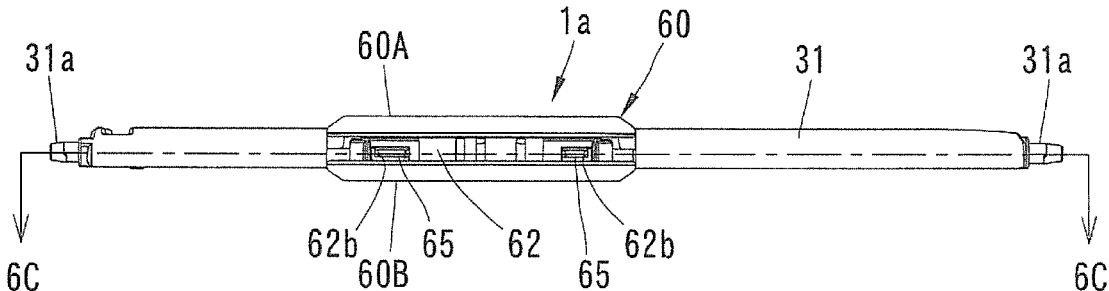
FIG. 5C is the wind direction adjusting device as viewed in the direction of arrow C of FIG. 5B.

As shown in FIGS. 5B and 6C, a pair of mounting portions 66b, 66b protruded toward upstream side are disposed in the upstream side wall portion 66 of the upper clamping piece 60A spaced from each other in the left-right direction. A basal end portion of the fork portion 80 (FIGS. 2 and 3) is pivotally supported by the mounting portions 66b, 66b.

The fork portion 80 extends toward the upstream side. A distal end portion of the fork portion 80 is forked to the left and right, forming a slit 80a extending from the upstream side to the downstream side. The engagement shaft 25 of the fin 21 in the middle of the upstream side fin group 20 is disposed in the slit 80a. Thereby, the fork portion 80 and the engagement shaft 25 are engaged with each other. Thereby, the operation knob 60 is interlocked with the fin 21 in the middle on the upstream side.

When the register 1 having the wind direction adjusting device 1a with the features mentioned above is in a state of blowing with the shutter 40 open, the wind direction can be adjusted in the left-right direction in the following manner. When the operation knob 60 is operated to slide to the left or to the right, the middle fin 21 is rotated to the left or to the right via engagement of the fork portion 80 and the engagement shaft 25. Further, the other fins 21 are rotated to the left or to the right via the interlocking link 22. Thereby, the wind direction can be adjusted in the left-right direction.

Further, the wind direction can be adjusted in the vertical direction by rotationally operating the operation knob 60 upward or downward. This causes the center fin 31 to be rotated upward or downward, which causes the side fins 32 to be rotated in the same direction via the interlocking link 33, thereby, the wind direction can be adjusted in the vertical direction.

As shown in FIGS. 4, 6A, 6B and 6C, the lower clamping piece 60B of the operation knob 60 of the wind direction adjusting device 1a with the features mentioned above has a protrusion 64 protruded upward (toward the center fin 31 side) disposed therein between the downstream side wall portion 62 and the upstream side wall portion 63. The protrusion 64 is a protruded portion, partially protruded from the upper surface of the lower clamping piece 60B. The protrusion 64 has a columnar configuration. The elastic member 70 is mounted on the protrusion 64.

The elastic member 70 is formed of an elastic material such as elastomer, resin or the like. In this embodiment, the elastic member 70 is formed of silicon resin in a flattened cuboidal configuration, flattened in the vertical direction. A hole portion 70a is formed in an under surface of the elastic member 70, which is a through-hole opened in the vertical direction in this embodiment. It is not required that the hole portion 70a should be opened through the elastic member 70. The protrusion 64 is fitted in the hole portion 70a, and thereby the elastic member 70 is mounted on the lower clamping piece 60B such that the elastic member 70 surrounds an outer periphery of the protrusion 64.

A receiving recess 31c is formed in an under surface of the center fin 31. The receiving recess 31c has a rectangular configuration in plan view, elongated in the left-right direction along a longitudinal direction of the center fin 31. The receiving recess 31c is a sunken portion formed in the under surface of the center fin 31, which is depressed in a shape of a rectangular container. The protrusion 64 and the elastic member 70 are received in the receiving recess 31c.

A depth of the receiving recess 31c is determined such that a distal end surface of the protrusion 64 is not contacted with a bottom surface of the receiving recess 31c and that an upper surface of the elastic member 70 is elastically contacted with the bottom surface of the receiving recess 31c. The depth of the receiving recess 31c may be determined such that the upper surface of the elastic member 70 is not contacted with the bottom surface of the receiving recess 31c.

The receiving recess 31c is formed such that a length thereof in a short direction (front-rear direction) is shorter than a length of the elastic member 70 mounted on the protrusion 64 in the front-rear direction. Therefore, the elastic member 70 is elastically contacted with the receiving recess 31c on the upstream side and on the downstream side.

The receiving recess 31c is formed such that a length thereof in a longitudinal direction (left-right direction) is longer than a length of the elastic member 70 mounted on the protrusion 64 in the left-right direction. Therefore, the protrusion 64 and the elastic member 70 are slidable in the left-right direction. Opposite ends of the receiving recess 31c in the left-right direction serve as stopper portions 31d, 31d that block slidable movement of the protrusion 64, and further slidable movement of the operation knob 60.

In the wind direction adjusting device 1a, the elastic member 70 is elastically contacted with the receiving recess 31c of the center fin 31. Thereby, when the operation knob 60 is slidably operated, sliding resistance is generated between the elastic member 70 and the center fin 31. Thereby, an adequate operational load is applied.

The slidably operated operation knob 60 is stopped by the movement of the protrusion 64 thereof being blocked by the stopper portions 31d, 31d of the receiving recess 31c. At this time, impact is alleviated by the elastic member 70 disposed between the protrusion 64 and the stopper portions 31d, 31d. Generation of abnormal noise can also be constrained.

Therefore, an operational feeling of the operation knob 60 can be improved.

The disclosure is not limited to the embodiment described above and various modifications may be adopted without departing from the spirit or scope of the disclosure.

A protrusion may be disposed in an upper clamping piece of an operation knob and a receiving recess may be formed in an upper surface of a center fin.

A protrusion may be disposed in a center fin and a receiving recess may be formed in an operation knob.

While one elastic member surrounding the protrusion is used in this embodiment, elastic members separated into an upstream side elastic member and a downstream side elastic member or separated into a left side elastic member and a right side elastic member may be used.

Wind direction may be adjusted in the left-right direction by a downstream side fin group and wind direction may be adjusted in the vertical direction by an upstream side fin group. In this case, the upstream side fin group includes a plurality of fins extending in the left-right direction and disposed spaced from each other in the vertical direction. The downstream side fin group includes a plurality of fins extending in the vertical direction and disposed spaced from each other in the left-right direction.

The present disclosure may be applied to a wind direction adjusting device for adjusting a wind direction of a vehicle register with an operation knob.

According to at least one embodiment of the present disclosure, a wind direction adjusting device in which an impact of an operation knob being stopped is alleviated can be provided.

Although an example embodiment and modification examples of the disclosure are described hereinabove, the foregoing embodiment and modification examples are mere examples and are not intended to limit the scope of the disclosure. It should be also appreciated that various omissions, replacements, and modifications may be made in the foregoing embodiment and modification examples described herein, without departing from the scope of the disclosure. The disclosure is intended to include such modifications and alterations in so far as they fall within the scope of the appended claims or the equivalents thereof.

The invention claimed is:

1. A wind direction adjusting device for a vehicle register comprising:

a downstream side fin extending in a direction crossing an extending direction of an upstream side fin;

an operation knob slidably attached to the downstream side fin, the operation knob interlocked with the upstream side fin, a direction of the upstream side fin being adjusted by sliding of the operation knob; and an elastic member disposed between the operation knob and the downstream side fin, the elastic member generating sliding resistance when the operation knob is slid, wherein a protrusion is disposed in one of the operation knob and the downstream side fin, the protrusion protruded toward the other of the operation knob and the downstream side fin, wherein a receiving recess is formed in the other of the operation knob and the downstream side fin along a sliding direction of the operation knob, the receiving recess relatively movably receiving the protrusion, stopper portions blocking relative movement of the protrusion and the receiving recess with respect to each other formed in opposite ends of the receiving recess, and wherein the elastic member is disposed between the protrusion and the stopper portions.

2. The wind direction adjusting device for the vehicle register according to claim 1, wherein a hole portion is formed in the elastic member, and wherein the protrusion is fitted in the hole portion and surrounded by the elastic member.

* * * * *